(12) United States Patent
Zhou et al.

(10) Patent No.: US 11,476,571 B2
(45) Date of Patent: **\*Oct. 18, 2022**

(54) ANTENNA ROUTING METHOD AND RELATED DEVICES

(71) Applicant: GUANGDONG OPPO MOBILE TELECOMMUNICATIONS CORP., LTD., Guangdong (CN)

(72) Inventors: Lei Zhou, Guangdong (CN); Zhi Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 23 days.

This patent is subject to a terminal disclaimer.

(21) Appl. No.: 17/109,961

(22) Filed: Dec. 2, 2020

(65) Prior Publication Data

US 2021/0226330 A1 Jul. 22, 2021

(30) Foreign Application Priority Data

Jan. 21, 2020 (CN) .......................... 202010072640.9

(51) Int. Cl.
*H01Q 1/52* (2006.01)
*H01Q 21/24* (2006.01)
(Continued)

(52) U.S. Cl.
CPC .............. *H01Q 1/523* (2013.01); *H01Q 21/24* (2013.01); *H01Q 21/28* (2013.01); *H04B 7/10* (2013.01)

(58) Field of Classification Search
CPC .................................................... H01Q 1/523
See application file for complete search history.

(56) References Cited

U.S. PATENT DOCUMENTS

2003/0214443 A1* 11/2003 Bauregger ............. H01Q 21/28
343/700 MS
2008/0094179 A1* 4/2008 Domenico ......... G06K 7/10336
340/10.1
(Continued)

FOREIGN PATENT DOCUMENTS

CN 102810126 A 12/2012
CN 103368624 A 10/2013
(Continued)

OTHER PUBLICATIONS

Chinese Notice of granting of patent right for invention with English Translation for CN Application 202010072640.9 dated Apr. 28, 2021. (12 pages).

(Continued)

*Primary Examiner* — Hsinchun Liao
(74) *Attorney, Agent, or Firm* — Young Basile Hanlon & MacFarlane, P.C.

(57) ABSTRACT

An antenna routing method and related devices are provided. The method is applicable to a user terminal equipment. The user terminal equipment includes multiple antenna groups distributed around a periphery of the user terminal equipment. Each antenna group includes two antennas. Two antennas in each antenna group are different in polarization direction. The method includes the following. Two antennas in each of any two adjacent antenna groups of the multiple antenna groups are enabled respectively and a first signal quality is measured, to obtain multiple first signal qualities. Two adjacent antenna groups with the optimal first signal quality are determined according to the multiple first signal qualities, to receive or transmit radio frequency signals.

15 Claims, 10 Drawing Sheets

(51) Int. Cl.
  *H01Q 21/28* (2006.01)
  *H04B 7/10* (2017.01)

(56) References Cited

U.S. PATENT DOCUMENTS

| | | |
|---|---|---|
| 2008/0122706 A1 | 5/2008 | Jalali |
| 2014/0269964 A1 | 9/2014 | Du et al. |
| 2016/0149634 A1 | 5/2016 | Kalkunte et al. |
| 2019/0014586 A1 | 1/2019 | Zhu et al. |
| 2019/0074883 A1 | 3/2019 | Park et al. |

FOREIGN PATENT DOCUMENTS

| | | |
|---|---|---|
| CN | 105049560 A | 11/2015 |
| CN | 105896071 A | 8/2016 |
| CN | 107580124 A | 1/2018 |
| CN | 107863605 A | 3/2018 |
| CN | 108092702 A | 5/2018 |
| CN | 108769377 A | 11/2018 |
| CN | 108923792 A | 11/2018 |
| CN | 108998877 A | 12/2018 |
| CN | 109525291 A | 3/2019 |
| CN | 109904626 A | 6/2019 |
| CN | 110649369 A | 1/2020 |
| CN | 111277314 A | 6/2020 |
| EP | 2925042 A1 | 9/2015 |
| WO | 2015046380 A1 | 4/2015 |
| WO | 2018111690 A1 | 6/2018 |
| WO | 2018219328 A1 | 12/2018 |
| WO | 2019158207 A1 | 8/2019 |

OTHER PUBLICATIONS

International Search Report for International Application PCT/CN2020/132931 dated Feb. 26, 2021. (10 pages).
Extended European Search Report for EP Application 20211630.7 dated May 7, 2021. (24 pages).
Chinese Notice of granting of patent right for invention with English Translation for CN Application 202010072640.9 dated Oct. 11, 2021. (12 pages).
Chinese Second Office Action with English Translation for CN Application 202010072640.9 dated Jun. 9, 2021. (15 pages).
First OA with English Translation issued in corresponding CN application No. 202010072640.9 dated Oct. 10, 2020.
Extended European Search Report for EP Application 20211469.0 dated May 7, 2021. (17 pages).
International Search Report for PCT Application PCT/CN2020/132930 dated Feb. 25, 2021. (10 pages).
3GPP TS 38.101-3 V15.7.0 (Sep. 2019), User Equipment (UE) radio transmission and reception; Part 3: Range 1 and Range 2 Interworking operation with other radios (Release 15). (173 pages).

\* cited by examiner

ANTENNA ROUTING METHOD AND RELATED DEVICES

CROSS-REFERENCE TO RELATED APPLICATION(S)

This application claims priority to Chinese Patent Application No. 202010072640.9, filed on Jan. 21, 2020, the entire disclosure of which is hereby incorporated by reference.

TECHNICAL FIELD

This disclosure relates to the technical field of communications, and particular to an antenna routing method and related devices.

BACKGROUND

With the progress of science and technology, mobile terminals such as mobile phones, tablet computers, and the like are provided with antennas so as to receive and transmit electromagnetic wave signals and realize wireless communication. Multiple-input multiple-output (MIMO) is a multi-antenna wireless communication system. Compared with a common single-input single-output (SISO) system, MIMO can utilize multiple antennas at a transmitting end to independently transmit signals, and utilize multiple antennas at a receiving end to receive and recover original information. MIMO has attracted much attention in recent years because it can significantly increase data throughput and transmission distance of a communication system without increasing bandwidth or total transmission power consumption. In an antenna system of multiple operation modes compatible with SISO and MIMO, low frequency correlation among antennas is high, and thus performance of the MIMO system is affected.

SUMMARY

In a first aspect, implementations provide an antenna routing method. The method is applicable to a user terminal equipment. The user terminal equipment includes multiple antenna groups distributed around a periphery of the user terminal equipment. Each antenna group includes two antennas. Two antennas in each antenna group are different in polarization direction. The method includes the following.

Two antennas in each of any two adjacent antenna groups of the multiple antenna groups are enabled respectively and a first signal quality is measured, to obtain multiple first signal qualities. Two adjacent antenna groups with the optimal first signal quality are determined according to the multiple first signal qualities, to receive or transmit radio frequency signals.

In a second aspect, implementations provide a user terminal equipment. The user terminal equipment includes a radio frequency front end module, multiple antenna groups, at least one processor, and a non-transitory computer readable storage.

The radio frequency front end module is configured to control antennas to receive and transmit radio frequency signals. The multiple antenna groups are distributed around a periphery of the user terminal equipment, where each antenna group includes two antennas. The non-transitory computer readable storage is coupled to the at least one processor and stores at least one computer executable instruction thereon which, when executed by the at least one processor, causes the at least one processor to: enable two antennas in each of any two adjacent antenna groups of the multiple antenna groups respectively and measure a first signal quality, repeat the above for other two adjacent antenna groups in the multiple antenna groups to obtain multiple first signal qualities, and determine, according to the multiple first signal qualities, two adjacent antenna groups with the optimal first signal quality, to receive or transmit radio frequency signals, when the antennas receive and transmit radio frequency signals.

In a third aspect, implementations provide an electronic device. The electronic device includes at least one processor, a communication interface, and a non-transitory computer readable storage coupled to the at least one processor and storing at least one computer executable instruction thereon. The at least one computer executable instruction, when executed by the at least one processor, causes the at least one processor to: enable two antennas in each of any two adjacent antenna groups of multiple antenna groups of the electronic device respectively and measure a first signal quality, to obtain multiple first signal qualities, wherein the multiple antenna groups are distributed around a periphery of the electronic device, each antenna group includes two antennas, and two antennas in each antenna group are different in polarization direction; and determine, according to the multiple first signal qualities, two adjacent antenna groups with the optimal first signal quality, to receive or transmit radio frequency signals.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

To render those skilled in the art to understand technical solutions of this application, the technical solutions in implementations of the present disclosure will be described clearly and completely hereinafter with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second" used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Figure 1:
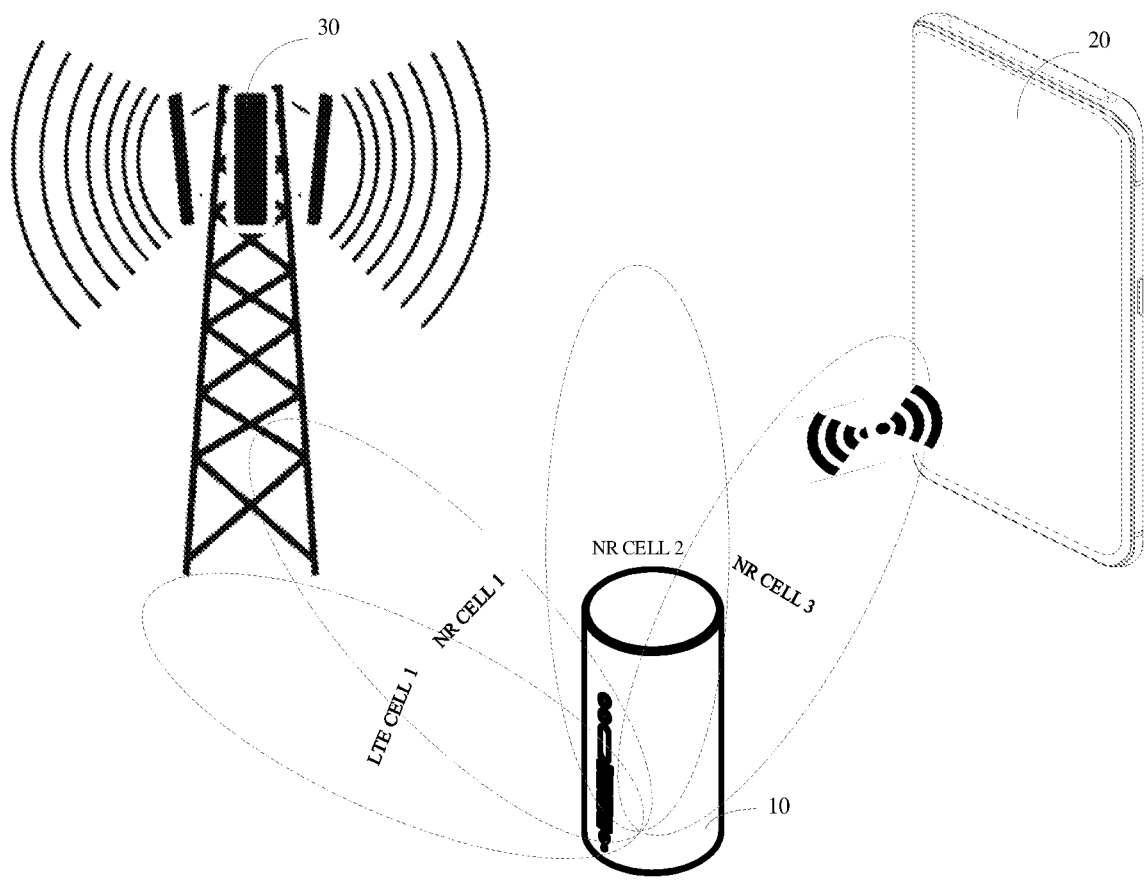
FIG. 1 is a schematic diagram illustrating an application system architecture of a user terminal equipment according to implementations.

FIG. 1 is a schematic diagram illustrating an application system architecture of a user terminal equipment according to implementations. As illustrated in FIG. 1, the user terminal equipment 10 is a customer premises equipment (CPE). The user terminal equipment 10 is configured to communicate with a base station 30, receive a first network signal sent by the base station 30, and convert the first network signal into a second network signal. The second network signal can be used by terminal devices 20 such as a tablet computer, a smart phone, a notebook computer, and the like. The first network signal may be, but is not limited to, a fifth generation (5G) mobile communication technology signal. The second network signal may be, but is not limited to, a wireless-fidelity (Wi-Fi) signal. The CPE can be widely applied to rural areas, towns, hospitals, factories, districts, and the like. The first network signals which can be accessed by the CPE can be wireless network signals, so that cost of laying a wired network can be saved.

Figure 2:
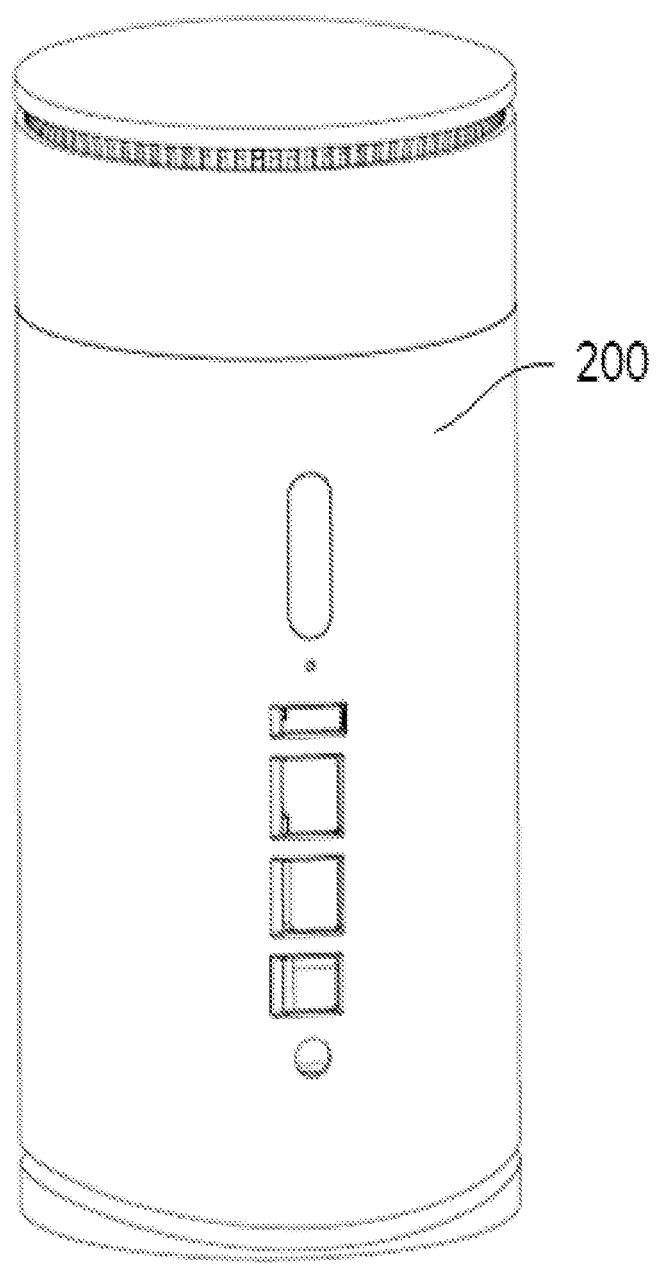
FIG. 2 is a schematic structural diagram illustrating a user terminal equipment according to implementations.

FIG. 2 is a schematic structural diagram illustrating a user terminal equipment according to implementations. As illustrated in FIG. 2, the user terminal equipment includes a housing 200. The housing 200 may be in a shape of a multi-space cylindrical cylinder, a cylindrical cylinder, or other shapes, which are not limited herein. The housing 200 may be made of, but is not limited to, an insulating material such as plastic. The user terminal equipment is a set of system combining software and hardware. As illustrated in FIG. 2, the user terminal equipment further includes multiple interfaces, where the multiple interfaces include an external interface and the external interface is used for electrically connecting with an external antenna group. The user terminal equipment further includes internal antennas and external antennas, where the internal antennas and the external antennas are used for transmitting and/or receiving radio frequency signals. The user terminal equipment may include but is not limited to a CPE. The CPE is a client of a novel optical fiber user access network service, and is used for providing services such as wired broadband, etc. The CPE is a mobile signal access device for receiving mobile signals and forwarding the mobile signals out via wireless Wi-Fi signals, and is also an equipment for converting network signals sent by a base station into Wi-Fi signals. The user terminal equipment selects four antennas from the internal antennas and the external antennas, to transmit and/or receive radio frequency signals, for example, receiving a first signal sent by the base station, converting the first signal into a second signal, and sending the second signal to terminal devices such as a smart phone and a tablet computer.

Figure 3:
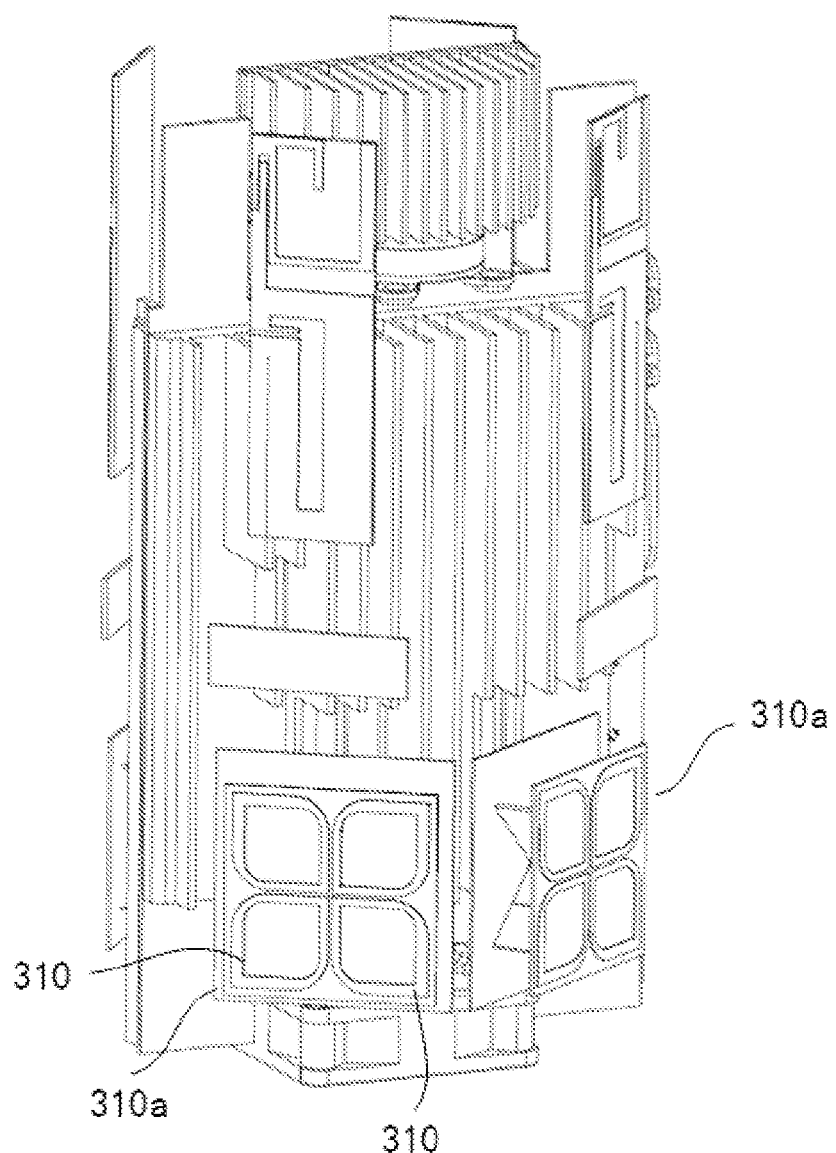
FIG. 3 is a schematic structural diagram illustrating the user terminal equipment of FIG. 2 with a housing removed according to implementations.

FIG. 3 is a schematic structural diagram illustrating the user terminal equipment of FIG. 2 with a housing removed according to implementations. The user terminal equipment includes multiple antenna groups 310a and a signal conversion device. The multiple antenna groups 310a are distributed around a periphery of the user terminal equipment. Each antenna group 310a includes two antennas 310. The two antennas 310 in each antenna group 310a are the same in orientation and are different in polarization direction. The multiple antennas 310 are configured to receive a first network signal. The signal conversion device is configured to select four antennas 310 from the multiple antennas 310 to receive the first network signal and configured to convert the first network signal received by the selected four antennas 310 into a second network signal.

The multiple antenna groups may be, but is not limited to, four antenna groups.

The antenna 310 may be, but is not limited to, a receiving antenna for millimeter wave signal or terahertz signal. Accordingly, the first network signal may be, but is not limited to, a millimeter wave signal or a terahertz signal. Currently, in the 5G wireless systems, according to the specification of the 3GPP TS 38.101, two frequency ranges are mainly used in 5G new radio (NR): frequency range (FR)1 and FR2. The frequency range corresponding to FR1 is 450 MHz~6 GHz, also known as the sub-6 GHz; the frequency range corresponding to FR2 is 24.25 GHz~52.6 GHz, usually called millimeter wave (mm Wave). 3GPP (release 15) specifies the present 5G millimeter wave as follows: n257 (26.5~29.5 GHz), n258 (24.25~27.5 GHz), n261 (27.5~28.35 GHz), and n260 (37~40 GHz). Millimeter wave signal or terahertz signal has advantages such as fast transmission speed. However, millimeter wave signal or terahertz signal is easily sheltered from by an external object. When there is an object between the antenna 310 and the base station 3, the first network signal received by the antenna 310 has weak signal strength. In this case, if the first network signal with weak signal strength is converted into the second network signal, a signal strength of the obtained second network signal may also be weak. In explanation of the implementations, the antenna 310 is a receiving antenna for sub-6 GHz signal. Accordingly, the first network signal is a radio frequency signal in a sub-6 GHz, and the second network signal may be, but is not limited to, a Wi-Fi signal.

The multiple antenna groups 310a may be disposed around the periphery of the user terminal equipment, which is not limited to the case where the multiple antenna groups 310a surround the inside of the housing 200 for one or more circles. The multiple antenna groups 310a may be directly or indirectly disposed on an inner wall of the housing 200 or disposed on other components, as long as the multiple antenna groups 310a surround the periphery of the user terminal equipment.

Due to uncertainty of the position of the base station 3 transmitting the first network signal, the transmission direction of the first network signal is uncertain. The signal strength of the first network signal received by the antenna 310 in each direction is also different. For example, when an object obscures between the antenna 310 and the base station 3, the first network signal received by the antenna 310 has weak signal strength. In this case, if the first network signal with weak signal strength is converted into the second network signal, a signal strength of the obtained second network signal may also be weak. According to this application, the multiple antennas 310 are distributed around the periphery of the user terminal equipment, such that the multiple antennas 310 can detect first network signals in multiple directions. In this way, accuracy of determining a first network signal with the strongest signal strength according to signal strengths of the collected first network signals can be improved, thereby providing a necessary basis for obtaining a second network signal(s) with stronger signal strength. The signal conversion device selects one or more first network signals with the strongest signal strength received by the antennas 310 and converts the one or more first network signals into one or more second network signals, thereby improving signal strengths of the converted second network signals.

In addition, the first network signal transmitted by the base station 3 exhibits elliptical polarization due to scattering and other reasons during propagation to the user terminal equipment. Usually, the antenna 310 in a certain polarization direction is unable to receive all energy of the first network signal, or even the energy of the first network signal received by the antenna 310 in a certain polarization direction is very low. In this application, two antennas 310 in one antenna group 310a are different in polarization direction, which can improve a probability that the first network signal received by the two antennas 310 in the antenna group 310a has higher energy.

In at least one example, one antenna group 310a includes two antennas 310. One antenna 310 of the two antennas 310 in the same antenna group 310a has a first polarization direction, and the other antenna 310 of the two antennas 310 in the same antenna group 310a has a second polarization direction, where the first polarization direction and the second polarization direction are ±45° polarization directions, respectively.

As described above, the first network signal transmitted by the base station 3 exhibits elliptical polarization due to scattering and other reasons during propagation to the user terminal equipment. A single antenna 310 in a horizontal polarization direction or a vertical polarization direction is unable to receive all of the energy. In order to receive as much energy of the first network signal as possible, two antennas 310 in mutually perpendicular polarization directions are disposed in one antenna group 310a to receive the first network signal. As such, the energy of the first network signal can be received at any time in the antenna group 310a. However, during transmission of the first network signal with vertical polarization or horizontal polarization, the first network signal becomes a first network signal with elliptical polarization, and the first network signal with elliptical polarization has inconsistent components in the vertical direction and the horizontal direction. If two antennas 310 in 0° and 90° linear polarization directions are respectively used in the antenna group 310a, most of the first network signal is received by one antenna 310. Therefore, to ensure that two antennas 310 in the same antenna group 310a can be effectively used, the two antennas 310 in the same antenna group 310a are respectively set to have ±45° polarization directions, so that each antenna 310 in the same antenna group 310a can effectively receive the first network signal.

At present, to support the conventional 2/3/4G network and 5G NR network by electronic devices such as mobile phones and other mobile terminal products, a four-antenna scheme is adopted in the design of the related wireless terminal products for the 5G NR band. However, when used indoors, there are problems such as serious energy consumption and heating, and large attenuation in received signal and reduced data transmission rate (throughput) with the base station.

In view of the above problems, this application provides an antenna routing method. The following describes implementations of this application in detail with reference to the accompanying drawings.

Figure 4:
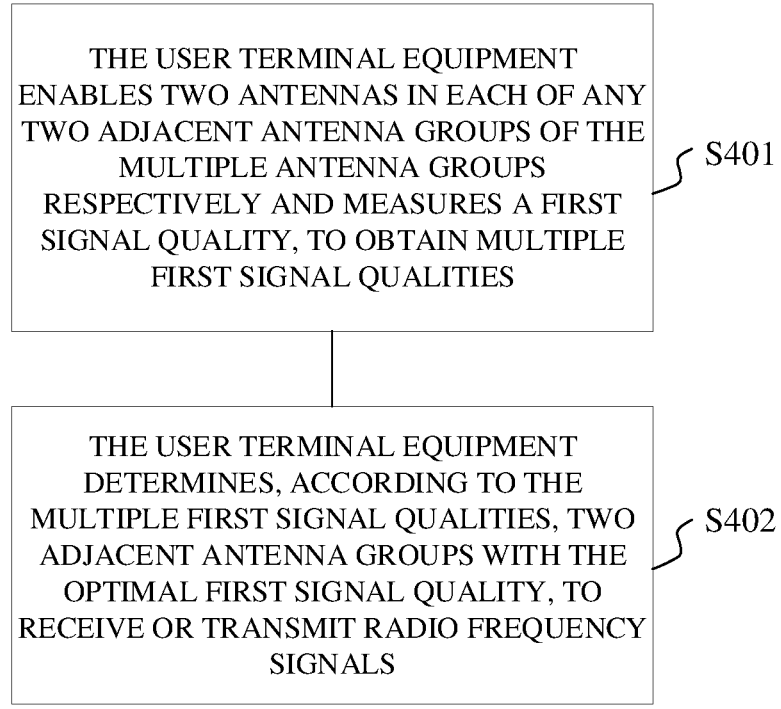
FIG. 4 is a flowchart illustrating an antenna routing method according to implementations.

FIG. 4 is a flowchart illustrating an antenna routing method according to implementations. The method is applicable to a user terminal equipment. The user terminal equipment includes multiple antenna groups distributed around a periphery of the user terminal equipment. Each antenna group includes two antennas. Two antennas in each antenna group are different in polarization direction. As illustrated in FIG. 4, the method begins at S401.

At S401, the user terminal equipment enables two antennas in each of any two adjacent antenna groups of the multiple antenna groups respectively and measures a first signal quality, to obtain multiple first signal qualities.

Figure 5:
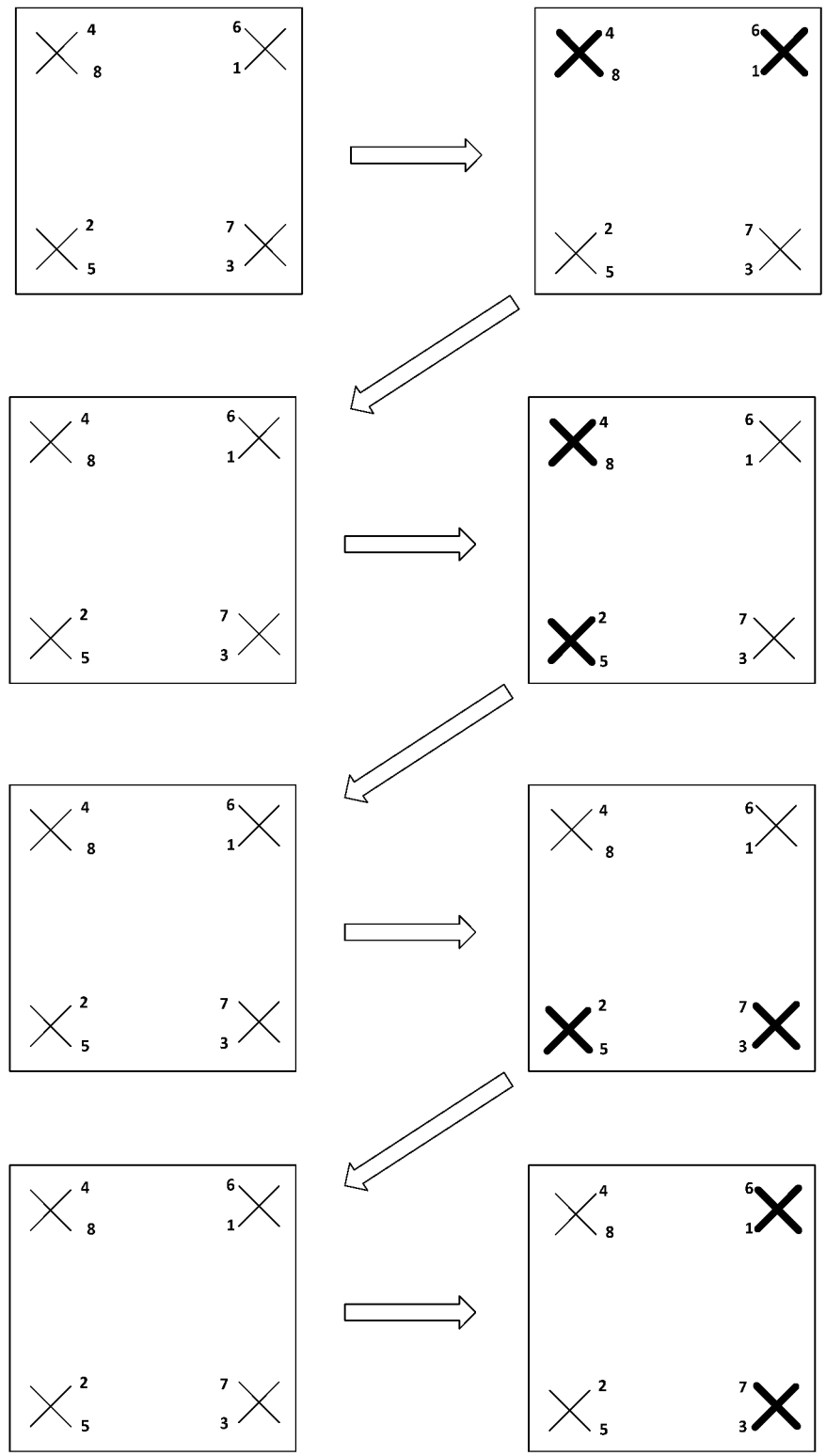
FIG. 5 is a schematic diagram illustrating a process of enabling every two adjacent antenna groups according to implementations.

FIG. 5 is a schematic diagram illustrating a process of enabling every two adjacent antenna groups according to implementations. As illustrated in FIG. 5, when the user terminal equipment detects startup or network access, two adjacent antenna groups selected from the multiple antenna groups are used to access a network of a base station. The network is a conventional 2/3/4G network and a 5G NR network, where the 5G NR network includes an NSA (non-standalone)/SA (standalone) network. The user terminal equipment enables two antennas in each of any two adjacent antenna groups of the multiple antenna groups respectively, such as, enables different sets of antennas in turn. For example, user terminal equipment enables a set of antennas of antenna 1 and antenna 6 as well as antenna 8 and antenna 4; or a set of antennas of antenna 2 and antenna 5 as well as antenna 8 and antenna 4; or a set of antennas of antenna 2 and antenna 5 as well as antenna 3 and antenna 7; or a set of antennas of antenna 3 and antenna 7 as well as antenna 1 and antenna 6. In the accompany drawings, the enabled antennas are denoted with bold line.

In an example, after two antennas in each of two adjacent antenna groups are successfully accessed to the network, the subsequent selection of antennas proceeds, otherwise, exit the NSA/SA network connection attempt.

Two antennas in an antenna group at one side (or edge) of a set of antennas in space of planes (shortened to plane-space) remains enabled, two antennas in another antenna group at the one side of the set of antennas in plane-space are disabled, and two antennas located at the diagonal of the two antennas in the in another antenna group are enabled. In this case, a signal quality of a current set of antennas is measured.

For example, when different sets of antennas are enabled, a first signal quality is respectively measured to obtain multiple first antenna qualities.

At S402, the user terminal equipment determines, according to the multiple first signal qualities, two adjacent antenna groups with the optimal first signal quality, to receive or transmit radio frequency signals.

The user terminal equipment compares the multiple first signal qualities measured, to determine the optimal first signal quality and corresponding two adjacent antenna groups, and receives or transmits radio frequency signals through the determined two adjacent antenna groups.

According to the implementation, the user terminal equipment includes the multiple antenna groups distributed around the periphery of the user terminal equipment, where each antenna group includes two antennas and two antennas in each antenna group are different in polarization direction. The user terminal equipment can enable two antennas in each of any two adjacent antenna groups of the multiple antenna groups respectively and measure to obtain the multiple first signal qualities, and determine the two adjacent antenna groups with the optimal first signal quality according to the multiple first signal qualities, to receive or transmit radio frequency signals. As can be seen, by disposing the multiple antenna groups on the housing of the user terminal equipment and selecting the two adjacent antenna groups with the optimal first signal quality for network access, it is possible to realize automatic direction adjustment according to an actual signal environment, and improve communication efficiency of antennas and a data transmission rate with the base station.

In at least one implementation, before enabling two antennas in each of any two adjacent antenna groups of the multiple antenna groups respectively, a plane connection mode is started to receive or transmit radio frequency signals. In the plane connection mode, one antenna is enabled in each of the multiple antenna groups.

Figure 6:
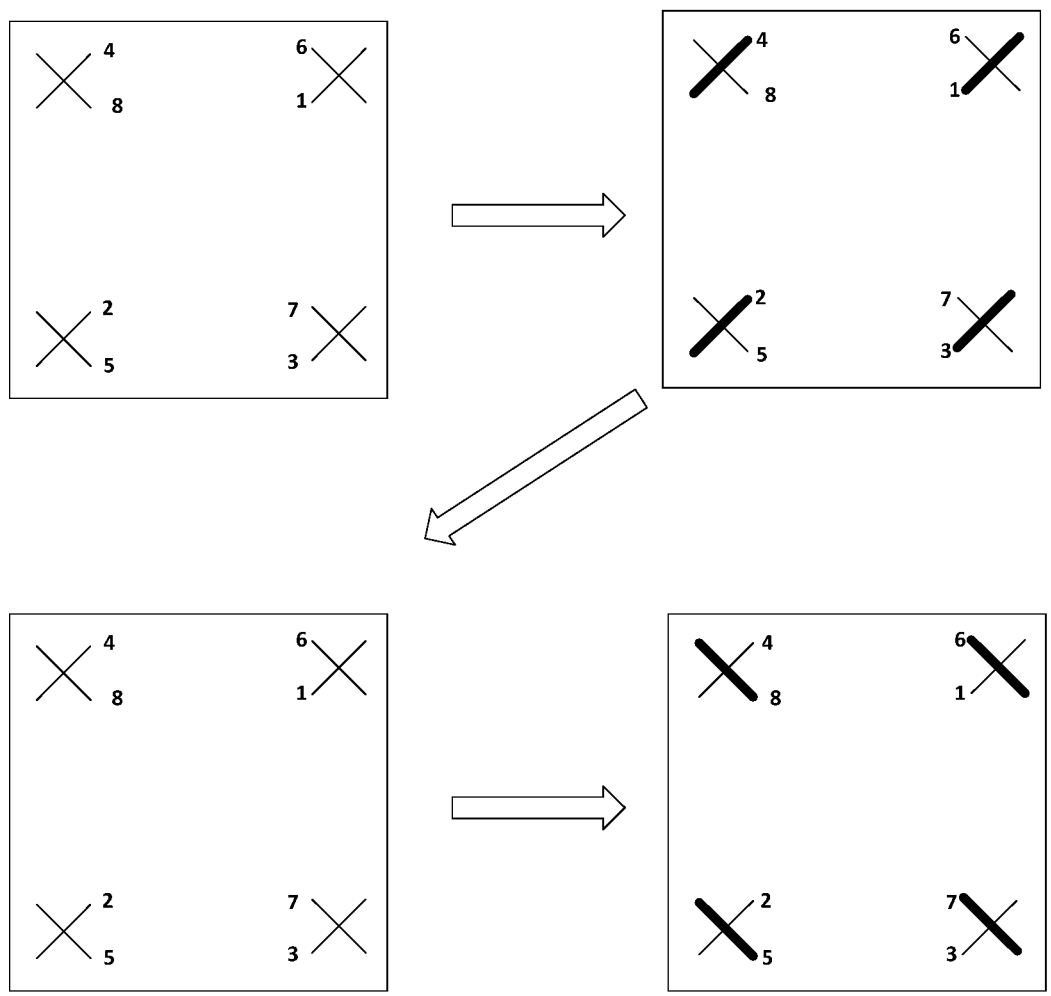
FIG. 6 is a schematic diagram illustrating selection of a set of antennas according to implementations.

FIG. 6 is a schematic diagram illustrating selection of a set of antennas according to implementations. FIG. 6 is a top view of the user terminal equipment. As illustrated in FIG. 6, when the user terminal equipment is started, or performs network access for the first time, the user terminal equipment attempts to access the network of the base station by using one antenna selected from each of multiple (e.g., four) antenna groups. The network is a conventional 2/3/4G network and a 5G NR network, where the 5G NR network includes an NSA/SA network. One antenna in each of the multiple antenna groups can be enabled as illustrated in FIG. 6, for example, a set of antennas of antenna 1, antenna 2, antenna 3, and antenna 4, or other sets of antennas (e.g., a set of antennas of antenna 5, antenna 6, antenna 7, and antenna 8), but each antenna group should have one antenna enabled for access to the network of the base station.

According to the implementation, the user terminal equipment can determine the plane connection mode by respectively enabling any one antenna in each of the multiple antenna groups, so as to avoid call drop of the user terminal equipment caused by poor signal quality during selection of antennas, and ensure the best signal quality and performance of the antennas in the plane connection mode.

In at least one implementation, two antennas in each of any two adjacent antenna groups of the multiple antenna groups are enabled respectively as follows. One enabled antenna in each of two adjacent antenna groups is disabled and one disabled antenna in each of the other two adjacent antenna groups is enabled, in turn in a preset direction.

Two antennas at one side of a set of antennas in plane-space remains enabled, remaining two antennas of the set of antennas in plane-space are disabled, and one disabled antenna in each of antenna modules at the one side are enabled. In this case, a signal quality of a current set of antennas is measured.

According to the user terminal equipment of the implementation, the signal quality of the antennas accessing the network can be ensured and efficiency of the antennas can be improved.

In at least one implementation, the plane connection mode is started after one enabled antenna in each of two adjacent antenna groups is disabled and one disabled antenna in each of the other two adjacent antenna groups is enabled.

Figure 7:
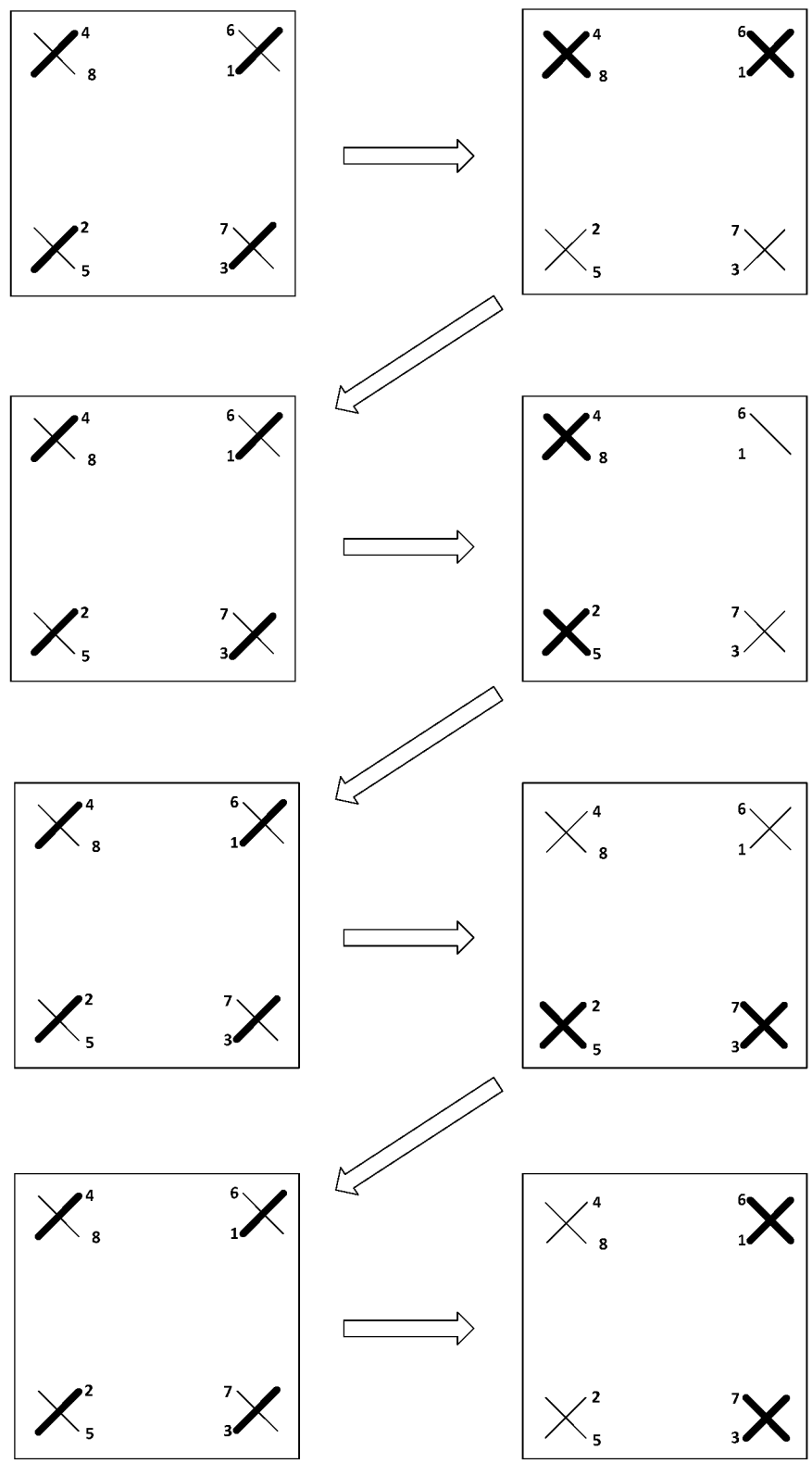
FIG. 7 is a schematic diagram illustrating selection of a set of antennas according to other implementations.

FIG. 7 is a schematic diagram illustrating selection of a set of antennas according to other implementations. FIG. 7 is a top view of the user terminal equipment. As illustrated in FIG. 7, in the user terminal equipment, for the first attempt, on/off states of antenna 1 and antenna 4 remain unchanged, antenna 2 and antenna 3 are disabled, and antenna 8 and antenna 6 are enabled, and in this case a signal quality R1 of the antennas is measured; thereafter, start the plane connection mode, i.e., return back to an initial state where a set of antenna containing antenna 1, antenna 2, antenna 3, and antenna 4 is enabled, for the second attempt, on/off states of antenna 2 and antenna 4 remain unchanged, antenna 1 and antenna 3 are disabled, and antenna 5 and antenna 8 are enabled, and in this case a signal quality R2 of the antennas is measured; thereafter, return back to the initial state, for the third attempt, on/off states of antenna 2 and antenna 3 remain unchanged, antenna 1 and antenna 4 are disabled, and antenna 5 and antenna 7 are enabled, and in this case a signal quality R3 of the antennas is measured; thereafter, return back to the initial state, for the fourth attempt, on/off states of antenna 1 and antenna 3 remain unchanged, antenna 2 and antenna 4 are disabled, and antenna 6 and antenna 7 are enabled, and in this case a signal quality R4 of the antennas is measured.

According to the implementation, based on the determined plane connection mode, the user terminal equipment can enable multiple collections (where each collection includes two adjacent antenna groups) and measure corresponding signal qualities, such that call drop of the user terminal equipment caused by poor signal quality during selection of antenna groups in space of sides or edges (shortened to side-space or edge-space) can be avoided, and the best signal quality and performance of two adjacent antenna groups can be ensured.

In at least one example, determine, according to the multiple first signal qualities, the two adjacent antenna groups with the optimal first signal quality, to receive or transmit radio frequency signals as follows. Determine, according to multiple collections, the corresponding multiple first signal qualities, and a preset spectrum efficiency algorithm, the two adjacent antenna groups with the optimal first signal quality, where each collection includes two adjacent antenna groups.

Determine, according to the multiple collections, the corresponding multiple first signal qualities, and the preset spectrum efficiency algorithm, the two adjacent antenna groups with the optimal first signal quality as follows. After the user terminal equipment switches a set of antennas in plane-space to any one of the multiple sets of antennas in side-space, receives measurement information corresponding to a current set of antennas in side-space reported by a modem, where the measurement information is a rank indicator, a signal-to-noise ratio (SINR) value of each rank, a reference signal receiving power, and a modulation order m of the current set of antennas in side-space in a preset period, and performs the spectrum efficiency algorithm according to the measurement information to determine spectrum efficiency corresponding to the current set of antennas in side-space. The spectrum efficiency algorithm includes the following. According to a preset mapping relation between channel quality indication (CQI) values and SINR values, determine a $CQI_k$ value of each flow in the SINR value, and according to a preset mapping relation between CQI values and code rates, determine a code rate $R_k$ corresponding to the $CQI_k$ value of each flow; calculate the spectrum efficiency corresponding to the current set of antennas in side-space according to a preset spectrum efficiency calculation formula, where the preset spectrum efficiency calculation formula may be: $\eta=\Sigma_{n=1}^{Rank} m*R_k$, and $\eta$ denotes spectrum efficiency. Herein, the set of antennas in plane-space means that only one antenna in each antenna group is enabled for network access.

According to the implementation, the user terminal equipment can select the optimal two adjacent antenna groups according to the multiple first signal qualities and the preset spectrum efficiency algorithm, to realize automatic direction adjustment according to the actual network signal environment and improve connection performance of the antennas.

In at least one implementation, one antenna in each of the multiple antenna groups is enabled as follows. Any one antenna from each antenna group is selected to receive or transmit radio frequency signals. Alternatively, optimal one antenna in each antenna group is selected to receive or transmit radio frequency signals. Alternatively, one antenna in each antenna group corresponding to the optimal first signal quality in previous connection records is selected to receive or transmit radio frequency signals.

When the user terminal equipment starts and then performs network access for the first time, the user terminal equipment can select any one antenna from each of four antenna groups to access a preset network. Alternatively, when the user terminal equipment starts, the user terminal equipment selects the optimal antennas, i.e., selects antennas with a large probability of successfully accessing the preset network, and then selects the optimal antennas during running. Alternatively, the user terminal equipment selects any one antenna from each of the four antenna groups to access the preset network according to placement and polarization of antennas. When the user terminal equipment performs network access not for the first time, the user terminal equipment can select previous (or historical) antennas with the optimal signal quality, for network access.

According to the implementation, automatic direction adjustment according to the actual network signal environment can be realized and connection performance of the antennas can be improved.

In at least one implementation, optimal one antenna in each antenna group is selected to receive or transmit radio frequency signals as follows. A signal quality of each antenna in the each antenna group is measured. One antenna in the each antenna group corresponding to the optimal signal quality is selected according to the signal quality of the each antenna to receive or transmit radio frequency signals.

When the user terminal equipment attempts to access the network of the base station, by directly measuring the signal quality of the each antenna, a signal quality of each antenna group is determined, and finally the two adjacent antenna groups with the optimal signal quality is selected to receive and transmit radio frequency signals.

For example, the signal quality of the each antenna can be obtained, such that the number of times for switching on/off states of antennas can be reduced. For example, at first, when only antenna 1, antenna 2, antenna 3, and antenna 4 are enabled, obtain a signal quality of each of antenna 1, antenna 2, antenna 3, and antenna 4, and then switch to a state where only antenna 5, antenna 6, antenna 7, and antenna 8 are enabled and obtain a signal quality of each of antenna 5, antenna 6, antenna 7, and antenna 8. As such, the single signal quality of each of the above eight antennas can be obtained, and a set of antennas with the optimal performance can be directly determined through calculation and determination.

According to the implementation, the user terminal equipment can select two adjacent antenna groups by determining the signal quality of the each antenna, such that a success rate of the user terminal equipment in network connection and connection performance of the antennas can be improved.

In at least one implementation, after determining, according to the multiple first signal qualities, the two adjacent antenna groups with the optimal first signal quality, to receive or transmit radio frequency signals, the following is further conducted. Any one antenna in an antenna group adjacent to one of the two adjacent antenna groups is enabled and any one antenna in the other of the two adjacent antenna groups is disabled. Multiple second signal qualities are measured. Determine, according to the multiple second signal qualities, a set of antennas with the optimal second signal quality, to receive or transmit radio frequency signals.

After the two adjacent antenna groups with the optimal first signal quality are determined to receive or transmit radio frequency signals, if a signal quality of the two adjacent antenna groups with the optimal first signal quality is less than a preset quality, an angular connection mode can be selected. That is, two antenna in any one of the determined two adjacent antenna groups remain enabled, any one antenna in the other of the determined two adjacent antenna groups is disabled, and any one antenna in an antenna group adjacent to the any one of the two adjacent antenna groups is enabled. For example, if the determined two adjacent antenna groups are an antenna group containing antenna 1 and antenna 6 and an antenna group containing antenna 4 and antenna 8, then the antenna group containing antenna 1 and antenna 6 remains enabled, any one antenna in the antenna group containing antenna 4 and antenna 8 is disabled, and any one antenna in an antenna group containing antenna 3 and antenna 7 adjacent to the antenna group containing antenna 1 and antenna 6 is enabled.

According to the implementation, when the signal quality of the two adjacent antenna groups with the optimal first signal quality is poor, the user terminal equipment can enable any one antenna in the antenna group adjacent to one of the two adjacent antenna groups and disable any one antenna in the other of the two adjacent antenna groups, thereby improving efficiency and capability of antenna routing.

In at least one implementation, two antennas in each of any two adjacent antenna groups of the multiple antenna groups are enabled as follows. Previous first signal qualities are acquired. Two adjacent antenna groups with the optimal previous first signal quality are enabled. Alternatively, one of the two adjacent antenna groups with the optimal previous first signal quality and an antenna group adjacent to the one of the two adjacent antenna groups with the optimal previous first signal quality are enabled.

The user terminal equipment enables two adjacent antenna groups as follows. The user terminal equipment directly acquires the previous first signal qualities stored by the user terminal equipment, and then enables the two adjacent antenna groups with the optimal previous first signal quality. Alternatively, the user terminal equipment enables one of the two adjacent antenna groups with the optimal previous first signal quality and an antenna group adjacent to the one of the two adjacent antenna groups with the optimal previous first signal quality. For example, assuming that the two adjacent antenna groups with the optimal previous first signal quality are an antenna group containing antenna 1 and antenna 6 as well as an antenna group containing antenna 4 and antenna 8, the antenna group containing antenna 1 and antenna 6 is enabled and an antenna group containing antenna 3 and antenna 7 adjacent the antenna group containing antenna 1 and antenna 6 is enabled; or the antenna group containing antenna 4 and antenna 8 is enabled and an antenna group containing antenna 2 and antenna 5 adjacent to the antenna group containing antenna 4 and antenna 8 is enabled.

According to the implementation, the user terminal equipment can access to the network according to the antenna groups with the optimal previous first signal quality, thereby improving efficiency and a success rate of network connection of the user terminal equipment.

In at least one implementation, after determining, according to the multiple first signal qualities, the two adjacent antenna groups with the optimal first signal quality, to receive or transmit radio frequency signals, the following is further conducted. When the user terminal equipment is disconnected and then reconnected to a network, two adjacent antenna groups with the suboptimal first signal quality are enabled according to the multiple first signal qualities, to receive or transmit radio frequency signals.

When disconnected from the network, the user terminal equipment enables the two adjacent antenna groups with the suboptimal first signal quality directly according to the multiple measured first signal qualities, for receiving and transmitting radio frequency signals.

According to the implementation, the user terminal equipment can switch two adjacent antenna groups according to the multiple first signal qualities when the user terminal equipment is disconnected from the network, so as to ensure stability of network connection of the antennas of the user terminal equipment.

Figure 8:
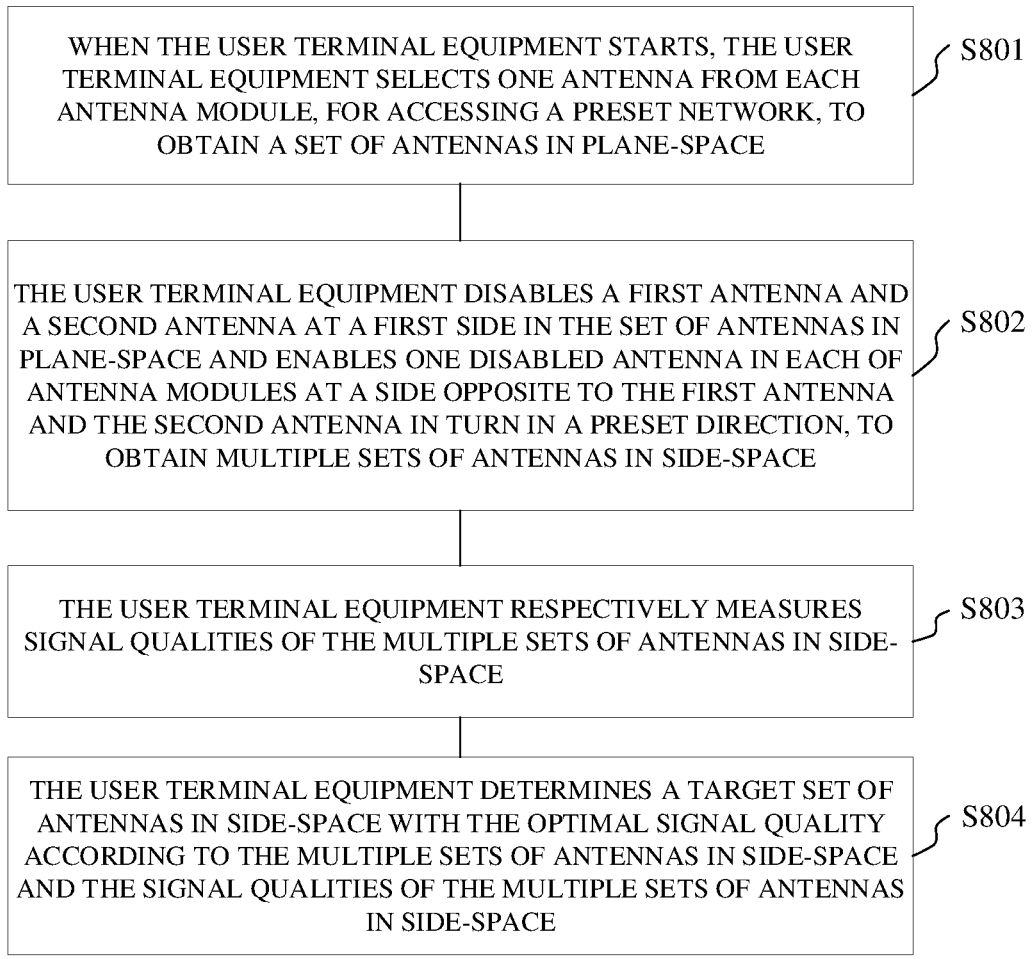
FIG. 8 is a flowchart illustrating an antenna routing method according to other implementations.

In accordance with the implementation of FIG. 4, FIG. 8 is a flowchart illustrating an antenna routing method according to other implementations. The method is applicable to a user terminal equipment. The user terminal equipment includes multiple antenna groups (or antenna modules) distributed around a periphery of the user terminal equipment. Each antenna group includes two antennas. Two antennas in each antenna group are different in polarization direction. As illustrated in FIG. 8, the method begins at S801.

At S801, when the user terminal equipment starts, the user terminal equipment selects one antenna from each antenna module, for accessing a preset network, to obtain a set of antennas in plane-space.

At S802, the user terminal equipment disables a first antenna and a second antenna at a first side in the set of antennas in plane-space and enables one disabled antenna in each of antenna modules at a side opposite to the first antenna and the second antenna in turn in a preset direction, to obtain multiple sets of antennas in side-space.

At S803, the user terminal equipment respectively measures signal qualities of the multiple sets of antennas in side-space.

At S804, the user terminal equipment determines a target set of antennas in side-space with the optimal signal quality according to the multiple sets of antennas in side-space and the signal qualities of the multiple sets of antennas in side-space.

According to the implementation, when the user terminal equipment starts, the user terminal equipment can select one antenna from each antenna module for accessing the preset network, to obtain the set of antennas in plane-space. Thereafter, the user terminal equipment can disable the first antenna and the second antenna in the set of antennas in plane-space and enable one disabled antenna in each of target antenna modules, to obtain the multiple sets of antennas in side-space and corresponding signal qualities, where antenna modules to which the first antenna and the second antenna respectively belong are adjacent antenna groups, and the target antenna modules are antenna modules except for the antenna modules to which the first antenna and the second antenna respectively belong. The user terminal equipment further can determine the target set of antennas in side-space with the optimal signal quality according to the multiple sets of antennas in side-space and the signal qualities of the multiple sets of antennas in side-space. As can be seen, multiple (e.g., four) antenna modules are disposed on the housing of the user terminal equipment, and the user terminal equipment performs initial network access through the set of antennas in plane-space, and selects two antenna modules with the best signal quality during selection of sets of antennas in side-space, to access the network. It is possible to realize automatic direction adjustment according to an actual signal environment, achieve best performance, and improve a data transmission rate with the base station.

Furthermore, the user terminal equipment can obtain the multiple sets of antennas in side-space based on the set of antennas in plane-space, and determine the target set of antennas in side-space by measuring the signal qualities of the multiple sets of antennas in side-space. It is possible to avoid call drop of the user terminal equipment caused by poor signal quality during selection of sets of antennas in side-space, and ensure the best signal quality and performance of the target set of antennas in side-space.

Figure 9:
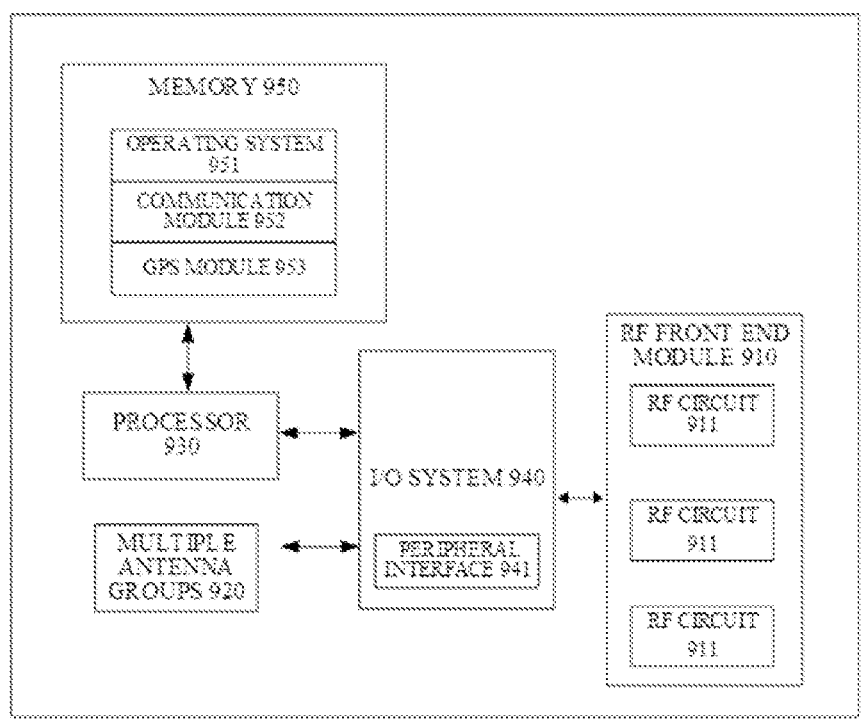
FIG. 9 is a schematic structural diagram illustrating a user terminal equipment according to implementations.

In accordance with the implementation of FIG. 4, FIG. 9 is a schematic structural diagram illustrating a user terminal equipment according to implementations. The user terminal equipment includes a radio frequency (RF) front end module 910, multiple antenna groups 920, at least one processor (such as a processor 930), an input/output (I/O) system 940, and a non-transitory computer readable storage (such as a memory 950). As illustrated in FIG. 9, the user terminal equipment includes the RF front end module 910, the multiple antenna groups 920, and the processor 930.

The RF front end module 910 is configured to control antennas to receive and transmit radio frequency signals. The RF front end module 910 includes multiple RF circuits 911.

The multiple antenna groups 920 are distributed around a periphery of the user terminal equipment, where each antenna group includes two antennas. The multiple antenna groups are electrically coupled with the RF front end module through a peripheral interface 941 of the I/O system 940.

The processor 930 is configured to enable two antennas in each of any two adjacent antenna groups of the multiple antenna groups respectively and measure a first signal quality, repeat the above for other two adjacent antenna groups in the multiple antenna groups to obtain multiple first signal qualities, and determine, according to the multiple first signal qualities, two adjacent antenna groups with the optimal first signal quality, to receive or transmit radio frequency signals, when the antennas receive and transmit radio frequency signals.

With reference to FIG. 5, "any two adjacent antenna groups" and "other two adjacent antenna groups" herein are explained in detail. For clarification, an antenna group containing antenna 1 and antenna 6 is called antenna group A, an antenna group containing antenna 4 and antenna 8 is called antenna group B, an antenna group containing antenna 2 and antenna 5 is called antenna group C, and an antenna group containing antenna 3 and antenna 7 is called antenna group D. If "any two adjacent antenna groups" are antenna groups A and B, "other two adjacent antenna groups" refer to antenna groups B and C, antenna groups C and D, and antenna groups D and A. That is, the processor 930 is configured to: only enable two antennas in each of antenna groups A and B, in this case two antennas in each of other antenna groups (i.e., antenna groups C and D) are disabled, and measure a first signal quality Q1; or only enable two antennas in each of antenna groups B and C, in this case two antennas in each of other antenna groups (i.e., antenna groups A and D) are disabled, and measure a first signal quality Q2; or only enable two antennas in each of antenna groups C and D, in this case two antennas in each of other antenna groups (i.e., antenna groups B and A) are disabled, and measure a first signal quality Q3; or only enable two antennas in each of antenna groups D and A, in this case two antennas in each of other antenna groups (i.e., antenna groups B and C) are disabled, and measure a first signal quality Q4. As such, multiple first signal qualities are obtained.

The memory 950 further includes an operating system 951, a communication module 952, and a global position system (GPS) module 953.

In at least one implementation, the processor 930 is further configured to: start a plane connection mode to receive or transmit radio frequency signals, where in the plane connection mode, one antenna is enabled in each of the multiple antenna groups.

In at least one implementation, the processor 930 is further configured to: disable one enabled antenna in each of two adjacent antenna groups and enable one disabled antenna in each of the other two adjacent antenna groups, in turn in a preset direction.

In at least one implementation, the processor 930 is further configured to: start the plane connection mode every time one disabled antenna in each of the other two adjacent antenna groups has been enabled and the first signal quality has been measured.

In at least one example, the processor 930 is further configured to: determine, according to multiple collections (where each collection includes two adjacent antenna groups), the corresponding multiple first signal qualities, and a preset spectrum efficiency algorithm, the two adjacent antenna groups with the optimal first signal quality.

In at least one implementation, the processor 930 is further configured to: select any one antenna from each antenna group to receive or transmit radio frequency signals; select optimal one antenna in each antenna group to receive or transmit radio frequency signals; or select one antenna in each antenna group corresponding to the optimal first signal quality in previous connection records to receive or transmit radio frequency signals.

In at least one implementation, the processor 930 is further configured to: measure a signal quality of each antenna in the each antenna group; and select, according to the signal quality of the each antenna, one antenna in the each antenna group corresponding to the optimal signal quality to receive or transmit radio frequency signals.

In at least one implementation, the processor 930 is further configured to: enable any one antenna in an antenna group adjacent to one of the two adjacent antenna groups and disable any one antenna in the other of the two adjacent antenna groups, measure multiple second signal qualities, and determine, according to the multiple second signal qualities, a set of antennas with the optimal second signal quality, to receive or transmit radio frequency signals, after the two adjacent antenna groups with the optimal first signal quality are determined according to the multiple first signal qualities to receive or transmit radio frequency signals.

In at least one implementation, the processor 930 is further configured to: acquire previous first signal qualities; and enable two adjacent antenna groups with the optimal previous first signal quality; or enable one of the two adjacent antenna groups with the optimal previous first signal quality and an antenna group adjacent to the one of the two adjacent antenna groups with the optimal previous first signal quality.

In at least one implementation, the processor 930 is further configured to: enable two adjacent antenna groups with the suboptimal first signal quality according to the multiple first signal qualities to receive or transmit radio frequency signals when the user terminal equipment is disconnected and then reconnected to a network, after the two adjacent antenna groups with the optimal first signal quality are determined according to the multiple first signal qualities to receive or transmit radio frequency signals.

Figure 10:
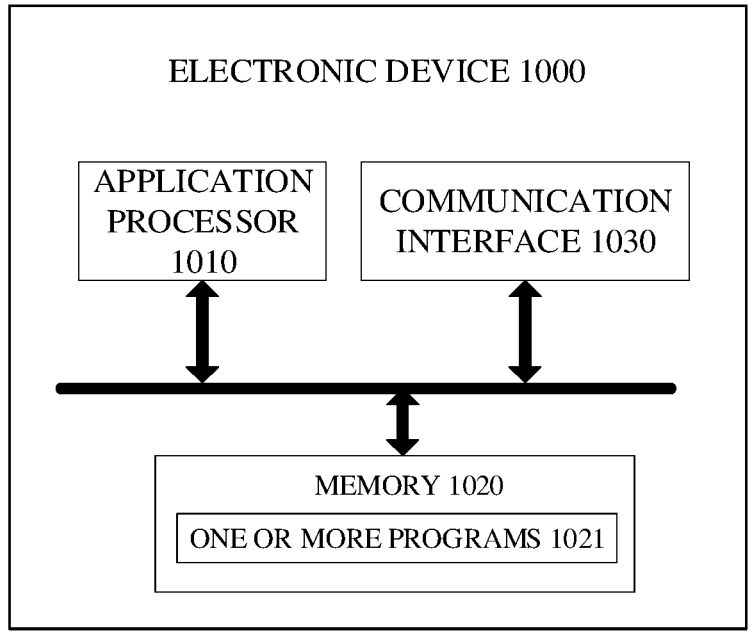
FIG. 10 is a schematic structural diagram illustrating an electronic device according to implementations.

In accordance with the implementation of FIG. 4, FIG. 10 is a schematic structural diagram illustrating an electronic device 1000 according to implementations. As illustrated in FIG. 10, the electronic device 1000 includes at least one processor (such as an application processor 1010), a communication interface 1030, a non-transitory computer readable storage (such as a memory 1020) coupled to the at least one processor 1010 and the communication interface 1030 and configured to store at least one computer executable instruction (such as one or more programs 1021). The one or more programs 1021 are configured to be executed by the application processor 1010 and include instructions configured to execute the following.

Two antennas in each of any two adjacent antenna groups of the multiple antenna groups are enabled respectively and a first signal quality is measured, to obtain multiple first signal qualities. Two adjacent antenna groups with the optimal first signal quality are determined according to the multiple first signal qualities, to receive or transmit radio frequency signals.

According to the implementation, the electronic device includes the multiple antenna groups distributed around the periphery of the electronic device, where each antenna group includes two antennas and two antennas in each antenna group are different in polarization direction. The electronic device can enable two antennas in each of any two adjacent antenna groups of the multiple antenna groups respectively and measure to obtain the multiple first signal qualities, and determine the two adjacent antenna groups with the optimal first signal quality according to the multiple first signal qualities, to receive or transmit radio frequency signals. As can be seen, by disposing the multiple antenna groups on the housing of the electronic device and selecting the two adjacent antenna groups with the optimal first signal quality for network access, it is possible to realize automatic direction adjustment according to an actual signal environment, and improve communication efficiency of antennas and a data transmission rate with the base station.

In at least one implementation, the one or more programs further include instructions configured to perform the following before enabling two antennas in each of any two adjacent antenna groups of the multiple antenna groups respectively. A plane connection mode is started to receive or transmit radio frequency signals, where in the plane connection mode, one antenna is enabled in each of the multiple antenna groups.

In at least one implementation, in terms of enabling two antennas in each of any two adjacent antenna groups of the multiple antenna groups respectively, the instructions of the one or more programs are configured to perform the following. In a preset direction, sequentially disable one enabled antenna in each of two adjacent antenna groups and enable one disabled antenna in each of the other two adjacent antenna groups.

In at least one implementation, in terms of enabling two antennas in each of any two adjacent antenna groups of the multiple antenna groups respectively and measuring the first signal quality to obtain the multiple first signal qualities, the instructions of the one or more programs are configured to perform the following. The plane connection mode is started every time one disabled antenna in each of the other two adjacent antenna groups has been enabled and the first signal quality has been measured.

In at least one implementation, in terms of enabling one antenna in each of the multiple antenna groups, the instructions of the one or more programs are configured to perform the following. Any one antenna from each antenna group is selected to receive or transmit radio frequency signals. Alternatively, optimal one antenna in each antenna group is selected to receive or transmit radio frequency signals. Alternatively, one antenna in each antenna group corresponding to the optimal first signal quality in previous connection records is selected to receive or transmit radio frequency signals.

In at least one implementation, in terms of selecting optimal one antenna in each antenna group to receive or transmit radio frequency signals, the instructions of the one or more programs are configured to perform the following. A signal quality of each antenna in the each antenna group is measured. One antenna in the each antenna group corresponding to the optimal signal quality is selected according to the signal quality of the each antenna to receive or transmit radio frequency signals.

In at least one implementation, the one or more programs further include instructions configured to perform the following after determining, according to the multiple first signal qualities, the two adjacent antenna groups with the optimal first signal quality, to receive or transmit radio frequency signals. Any one antenna in an antenna group adjacent to one of the two adjacent antenna groups is enabled and any one antenna in the other of the two adjacent antenna groups is disabled. Multiple second signal qualities are measured. Determine, according to the multiple second signal qualities, a set of antennas with the optimal second signal quality, to receive or transmit radio frequency signals.

In at least one implementation, in terms of enabling two antennas in each of any two adjacent antenna groups of the multiple antenna groups, the instructions of the one or more programs are configured to perform the following. Previous first signal qualities are acquired. Two adjacent antenna groups with the optimal previous first signal quality are enabled. Alternatively, one of the two adjacent antenna groups with the optimal previous first signal quality and an antenna group adjacent to the one of the two adjacent antenna groups with the optimal previous first signal quality are enabled.

In at least one implementation, the one or more programs further include instructions configured to perform the following after determining, according to the multiple first signal qualities, the two adjacent antenna groups with the optimal first signal quality, to receive or transmit radio frequency signals. When the electronic device is disconnected and then reconnected to a network, two adjacent antenna groups with the suboptimal first signal quality are enabled according to the multiple first signal qualities, to receive or transmit radio frequency signals.

The foregoing solution of the implementations of the disclosure is mainly described from the viewpoint of execution process of the method. It can be understood that, in order to implement the above functions, the user terminal equipment or the electronic device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the user device equipment in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 11:
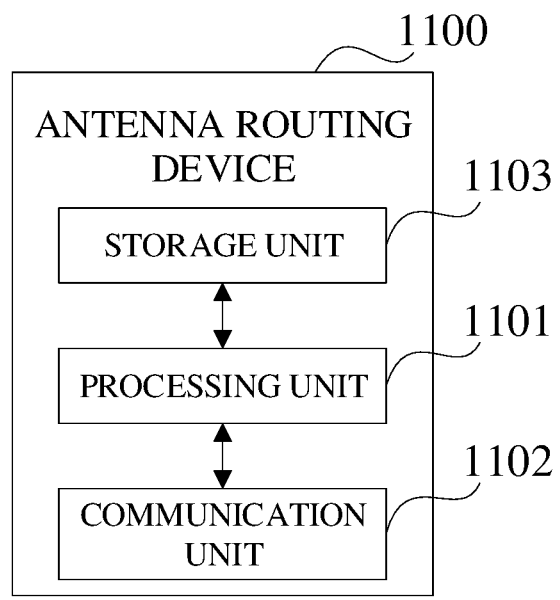
FIG. 11 is a block diagram of functional units of an antenna routing device according to implementations.

FIG. 11 is a block diagram of functional units of an antenna routing device 1100 according to implementations. The antenna routing device 1100 is applicable to a user terminal equipment. The user terminal equipment includes multiple antenna groups distributed around a periphery of the user terminal equipment. Each antenna group includes two antennas. Two antennas in each antenna group are different in polarization direction. The device includes a processing unit 1101 and a communication unit 1102.

The processing unit 1101 is configured to enable two antennas in each of any two adjacent antenna groups of the multiple antenna groups respectively, measure to obtain multiple first signal qualities, and determine, according to the multiple first signal qualities, two adjacent antenna groups with the optimal first signal quality, to receive or transmit radio frequency signals.

The antenna routing device 1100 may further include a storage unit 1103 for storing program codes and data of the user terminal equipment. The processing unit 1101 may be a processor, the communication unit 1102 may be a touch display screen or a transceiver, and the storage unit 1103 may be a memory.

According to the implementation, the user terminal equipment includes the multiple antenna groups distributed around the periphery of the user terminal equipment, where each antenna group includes two antennas and two antennas in each antenna group are different in polarization direction. The user terminal equipment can enable two antennas in each of any two adjacent antenna groups of the multiple antenna groups respectively and measure to obtain the multiple first signal qualities, and determine the two adjacent antenna groups with the optimal first signal quality according to the multiple first signal qualities, to receive or transmit radio frequency signals. As can be seen, by disposing the multiple antenna groups on the housing of the user terminal equipment and selecting the two adjacent antenna groups with the optimal first signal quality for network access, it is possible to realize automatic direction adjustment according to an actual signal environment, and improve communication efficiency of antennas and a data transmission rate with the base station.

In at least one implementation, the processing unit 1101 is further configured to: start a plane connection mode to receive or transmit radio frequency signals, where the plane connection mode is one antenna in each of the multiple antenna groups, before enabling two antennas in each of any two adjacent antenna groups of the multiple antenna groups respectively.

In at least one implementation, in terms of enabling two antennas in each of any two adjacent antenna groups of the multiple antenna groups respectively, the processing unit 1101 is configured to, along a preset direction, sequentially disable one enabled antenna in each of two adjacent antenna groups and enable one disabled antenna in each of the other two adjacent antenna groups.

In at least one implementation, in terms of enabling two antennas in each of any two adjacent antenna groups of the multiple antenna groups respectively and measuring the first signal quality to obtain the multiple first signal qualities, the processing unit 1101 is configured to start the plane connection mode after one disabled antenna in each of the other two adjacent antenna groups is enabled and the first signal quality is measured for each time.

In at least one implementation, in terms of enabling one antenna in each of the multiple antenna groups, the processing unit 1101 is configured to: select any one antenna from each antenna group to receive or transmit radio frequency signals; select optimal one antenna in each antenna group to receive or transmit radio frequency signals; or select one antenna in each antenna group corresponding to the optimal first signal quality in previous connection records to receive or transmit radio frequency signals.

In at least one implementation, in terms of selecting optimal one antenna in each antenna group to receive or transmit radio frequency signals, the processing unit 1101 is configured to: measure a signal quality of each antenna in the each antenna group; and select, according to the signal quality of the each antenna, one antenna in the each antenna group corresponding to the optimal signal quality to receive or transmit radio frequency signals.

In at least one implementation, the processing unit 1101 is further configured to: enable any one antenna in an antenna group adjacent to one of the two adjacent antenna groups and disable any one antenna in the other of the two adjacent antenna groups, measure multiple second signal qualities, and determine, according to the multiple second signal qualities, a set of antennas with the optimal second signal quality, to receive or transmit radio frequency signals, after the two adjacent antenna groups with the optimal first signal quality are determined according to the multiple first signal qualities to receive or transmit radio frequency signals, after determining, according to the multiple first signal qualities, the two adjacent antenna groups with the optimal first signal quality, to receive or transmit radio frequency signals.

In at least one implementation, in terms of enabling two antennas in each of any two adjacent antenna groups of the multiple antenna groups, the processing unit 1101 is configured to: acquire previous first signal qualities; and enable two adjacent antenna groups with the optimal previous first signal quality; or enable one of the two adjacent antenna groups with the optimal previous first signal quality and an antenna group adjacent to the one of the two adjacent antenna groups with the optimal previous first signal quality.

In at least one implementation, the processing unit 1101 is further configured to: enable two adjacent antenna groups with the suboptimal first signal quality according to the multiple first signal qualities to receive or transmit radio frequency signals when the user terminal equipment is disconnected and then reconnected to a network, after the two adjacent antenna groups with the optimal first signal quality are determined according to the multiple first signal qualities to receive or transmit radio frequency signals, after determining, according to the multiple first signal qualities, the two adjacent antenna groups with the optimal first signal quality, to receive or transmit radio frequency signals.

It can be understood that, the method implementations and the device implementations are different presentation forms of the same technical concept, and thus in this application, contents of the method implementations should be adapted to the device implementations, which is not repeated herein.

Implementations of the present disclosure further provide a computer storage medium. The computer storage medium may store computer programs for electronic data interchange. When executed, the computer programs cause a computer to accomplish all or part of the operations of any of method described in the above method implementations. The computer includes a user terminal equipment.

Implementations of the present disclosure further provide a computer program product. The computer program product includes a non-transitory computer readable storage medium storing computer programs. The computer programs are operable with a computer to accomplish all or part of the operations of any of the methods described in the above method implementations. The computer program product may be a software installation package. The computer includes a user terminal equipment.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection via some interfaces, or may be indirect coupling or communication among devices or units, and may be electrical connection, or other forms of connection.

The units described as separate components may or may not be physically separate, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a ROM, a RAM, Disk or CD, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for antenna routing, applicable to a user terminal equipment, the user terminal equipment comprising a plurality of antenna groups distributed around a periphery of the user terminal equipment, each antenna group comprising two antennas, and two antennas in each antenna group being different in polarization direction, and the method comprising:
   starting a plane connection mode to receive or transmit radio frequency signals, wherein in the plane connection mode, one antenna is enabled in each of the plurality of antenna groups;
   enabling two antennas in each of any two adjacent antenna groups of the plurality of antenna groups respectively and measuring a first signal quality, to obtain a plurality of first signal qualities; and
   determining, according to the plurality of first signal qualities, two adjacent antenna groups with the optimal first signal quality, to receive or transmit radio frequency signals,
   wherein enabling two antennas in each of any two adjacent antenna groups of the plurality of antenna groups respectively comprises:
      disabling one enabled antenna in each of two adjacent antenna groups and enabling one disabled antenna in each of the other two adjacent antenna groups in turn in a preset direction.

2. The method of claim 1, further comprising:
   after disabling one enabled antenna in each of two adjacent antenna groups and enabling one disabled antenna in each of the other two adjacent antenna groups, starting the plane connection mode.

3. The method of claim 1, wherein enabling one antenna in each of the plurality of antenna groups comprises:
   selecting any one antenna from each antenna group to receive or transmit radio frequency signals;
   selecting optimal one antenna in each antenna group to receive or transmit radio frequency signals; or
   selecting one antenna in each antenna group corresponding to the optimal first signal quality in previous connection records to receive or transmit radio frequency signals.

4. The method of claim 3, wherein selecting optimal one antenna in each antenna group to receive or transmit radio frequency signals comprises:
   measuring a signal quality of each antenna in the each antenna group; and
   selecting, according to the signal quality of the each antenna, one antenna in the each antenna group corresponding to the optimal signal quality to receive or transmit radio frequency signals.

5. The method of claim 1, further comprising:
   after determining, according to the plurality of first signal qualities, the two adjacent antenna groups with the optimal first signal quality, to receive or transmit radio frequency signals:
      enabling any one antenna in an antenna group adjacent to one of the two adjacent antenna groups and disabling any one antenna in the other of the two adjacent antenna groups;
      measuring a plurality of second signal qualities; and
      determining, according to the plurality of second signal qualities, a set of antennas with the optimal second signal quality, to receive or transmit radio frequency signals.

6. The method of claim 1, further comprising:
   after determining, according to the plurality of first signal qualities, the two adjacent antenna groups with the optimal first signal quality, to receive or transmit radio frequency signals,
      enabling, according to the plurality of first signal qualities, two adjacent antenna groups with the suboptimal first signal quality, to receive or transmit radio frequency signals, when the user terminal equipment is disconnected and then reconnected to a network.

7. A user terminal equipment, comprising:
   a radio frequency front end module configured to control antennas to receive and transmit radio frequency signals;
   a plurality of antenna groups distributed around a periphery of the user terminal equipment, wherein each antenna group comprises two antennas;
   at least one processor; and a non-transitory computer readable storage coupled to the at least one processor and storing at least one computer executable instruction thereon which, when executed by the at least one processor, causes the at least one processor to:
  start a plan connection mode to receive or transmit radio frequency signals, wherein in the plane connection mode, one antenna is enabled in each of the plurality of antenna groups;
  enable two antennas in each of any two adjacent antenna groups of the plurality of antenna groups respectively and measure a first signal quality, repeat the above for other two adjacent antenna groups in the plurality of antenna groups to obtain a plurality of first signal qualities, and determine, according to the plurality of first signal qualities, two adjacent antenna groups with the optimal first signal quality, to receive or transmit radio frequency signals,
  wherein to enable one antenna in each of the plurality of antenna groups comprises one of:
    select any one antenna from each antenna group to receive or transmit radio frequency signals;
    select optimal one antenna in each antenna group to receive or transmit radio frequency signals; or
    select one antenna in each antenna group corresponding to the optimal first signal quality in previous connection records to receive or transmit radio frequency signals.

8. The user terminal equipment of claim 7, wherein the at least one processor configured to enable two antennas in each of any two adjacent antenna groups of the plurality of antenna groups respectively is configured to disable one enabled antenna in each of two adjacent antenna groups and enable one disabled antenna in each of the other two adjacent antenna groups in turn in a preset direction.

9. The user terminal equipment of claim 8, wherein the at least one processor is further configured to start the plane connection mode.

10. The user terminal equipment of claim 7, wherein the at least one processor configured to select optimal one antenna in each antenna group to receive or transmit radio frequency signals is configured to:
  measure a signal quality of each antenna in the each antenna group; and
  select, according to the signal quality of the each antenna, one antenna in the each antenna group corresponding to the optimal signal quality to receive or transmit radio frequency signals.

11. The user terminal equipment of claim 7, wherein the at least one processor is further configured to enable any one antenna in an antenna group adjacent to one of the two adjacent antenna groups and disable any one antenna in the other of the two adjacent antenna groups, measure a plurality of second signal qualities, and determine, according to the plurality of second signal qualities, a set of antennas with the optimal second signal quality, to receive or transmit radio frequency signals.

12. The user terminal equipment of claim 7, wherein the at least one processor configured to enable two antennas in each of any two adjacent antenna groups of the plurality of antenna groups is configured to:
  acquire previous first signal qualities; and
  enable two adjacent antenna groups with the optimal previous first signal quality; or
  enable one of the two adjacent antenna groups with the optimal previous first signal quality and an antenna group adjacent to the one of the two adjacent antenna groups with the optimal previous first signal quality.

13. The user terminal equipment of claim 7, wherein the at least one processor is further configured to enable two adjacent antenna groups with the suboptimal first signal quality according to the plurality of first signal qualities to receive or transmit radio frequency signals when the user terminal equipment is disconnected and then reconnected to a network.

14. An electronic device, comprising:
  at least one processor;
  a communication interface; and
  a non-transitory computer readable storage coupled to the at least one processor and storing at least one computer executable instruction thereon which, when executed by the at least one processor, causes the at least one processor to:
    enable two antennas in each of any two adjacent antenna groups of a plurality of antenna groups of the electronic device respectively and measure a first signal quality, to obtain a plurality of first signal qualities, wherein the plurality of antenna groups are distributed around a periphery of the electronic device, each antenna group comprises two antennas, and two antennas in each antenna group are different in polarization direction;
    determine, according to the plurality of first signal qualities, two adjacent antenna groups with the optimal first signal quality, to receive or transmit radio frequency signals; and
    enable, according to the plurality of first signal qualities, two adjacent antenna groups with the suboptimal first signal quality, to receive or transmit radio frequency signals, when the user terminal equipment is disconnected and then reconnected to a network.

15. The electronic device of claim 14, wherein the at least one processor is further configured to:
  start a plane connection mode to receive or transmit radio frequency signals, wherein in the plane connection mode, one antenna is enabled in each of the plurality of antenna groups.

* * * * *